United States Patent
Alstrin et al.

(10) Patent No.: US 7,751,148 B1
(45) Date of Patent: Jul. 6, 2010

(54) MULTI-LEVEL, MULTI-TRACK MAGNETIC RECORDING HEAD

(75) Inventors: April L. Alstrin, Boulder, CO (US); Francis Campos, Louisville, CO (US); Carl Anthony Helms, Lafayette, CO (US); Kevin Dale McKinstry, Denver, CO (US)

(73) Assignee: Oracle America, Inc., Redwood City, CA (US)

(*) Notice: Subject to any disclaimer, the term of this patent is extended or adjusted under 35 U.S.C. 154(b) by 698 days.

(21) Appl. No.: 11/389,842

(22) Filed: Mar. 27, 2006

(51) Int. Cl.
*G11B 5/29* (2006.01)
*G11B 5/127* (2006.01)

(52) U.S. Cl. ............ 360/241.1; 360/121; 360/316
(58) Field of Classification Search ........ 360/64, 360/121, 129, 316, 317, 241.1
See application file for complete search history.

(56) References Cited

U.S. PATENT DOCUMENTS

| | | | |
|---|---|---|---|
| 3,846,841 A | 11/1974 | Lazzari et al. | |
| 3,890,558 A | 6/1975 | Guisinger et al. | |
| 3,893,188 A | 7/1975 | Shoemaker | |
| 4,254,500 A | 3/1981 | Brookhart | |
| 4,731,676 A | 3/1988 | Berlekamp | |
| 4,808,900 A | 2/1989 | Ohlinger et al. | |
| 5,018,034 A | 5/1991 | Tanaka et al. | |
| 5,034,838 A | 7/1991 | Brock et al. | |
| 5,121,270 A | 6/1992 | Alcudia et al. | |
| 5,208,714 A | 5/1993 | Denison et al. | |
| 5,293,280 A | 3/1994 | Ishikawa et al. | |
| 5,307,217 A * | 4/1994 | Saliba | 360/76 |
| 5,394,285 A | 2/1995 | Sundaram | |
| 5,423,116 A | 6/1995 | Sundaram | |
| 5,523,904 A | 6/1996 | Saliba | |
| 5,576,905 A | 11/1996 | Garcia et al. | |
| 5,585,977 A | 12/1996 | Gooch | |
| 5,602,703 A * | 2/1997 | Moore et al. | 360/121 |
| 5,678,086 A | 10/1997 | Gandola et al. | |
| 5,982,591 A * | 11/1999 | Folkerts et al. | 360/121 |

(Continued)

FOREIGN PATENT DOCUMENTS

JP     62273615 A     11/1987

(Continued)

OTHER PUBLICATIONS

English machine translation of JP 2003-338012 A to Osue et al., published on Nov. 28, 2003.*

(Continued)

*Primary Examiner*—William J Klimowicz
(74) *Attorney, Agent, or Firm*—Brooks Kushman P.C.

(57) ABSTRACT

In at least one embodiment, a magnetic recording head comprising first and second linear levels of magnetic recording devices is provided. Each device in the first linear level is aligned adjacently in a row and is spaced apart from another device in the first linear level. The first linear level is perpendicular to a comparative direction of a recording media travel. The second linear level of magnetic recording devices being connected to the first linear level of magnetic recording devices. Each device in the second linear level is aligned adjacently in a row and is spaced apart from another device in the second linear level. Each device in the second linear level is aligned with an insulating gap between the each device in the first linear level.

20 Claims, 6 Drawing Sheets

U.S. PATENT DOCUMENTS

| | | | |
|---|---|---|---|
| 6,016,233 A | 1/2000 | Scholz et al. | |
| 6,097,570 A | 8/2000 | Dee | |
| 6,195,232 B1 | 2/2001 | Cohen | |
| 6,222,698 B1 | 4/2001 | Barndt et al. | |
| 6,305,629 B1 | 10/2001 | Chliwnyj et al. | |
| 6,496,329 B2 | 12/2002 | Hungerford et al. | |
| 6,577,469 B2 | 6/2003 | Kennedy et al. | |
| 6,611,167 B2 | 8/2003 | McMahon et al. | |
| 6,611,398 B1 | 8/2003 | Rumpler et al. | |
| 6,778,359 B1 * | 8/2004 | Iwama | 360/129 |
| 6,914,756 B2 | 7/2005 | Molstad et al. | |
| 6,952,330 B1 | 10/2005 | Riddering et al. | |
| 6,958,956 B1 | 10/2005 | Jacquet et al. | |
| 6,965,563 B1 | 11/2005 | Hospodor et al. | |
| 7,193,812 B2 * | 3/2007 | Eaton | 360/121 |
| 7,400,474 B2 * | 7/2008 | Biskeborn et al. | 360/323 |
| 7,453,671 B1 | 11/2008 | Nibarger et al. | |
| 7,486,475 B2 | 2/2009 | Biskeborn | |
| 7,486,476 B2 | 2/2009 | Biskeborn | |
| 2003/0035248 A1 * | 2/2003 | Daby et al. | 360/317 |
| 2003/0039069 A1 * | 2/2003 | Biskeborn | 360/129 |
| 2003/0151855 A1 * | 8/2003 | Molstad et al. | 360/316 |
| 2004/0021982 A1 | 2/2004 | Ozue et al. | |
| 2004/0050163 A1 | 3/2004 | Biskeborn et al. | |
| 2004/0060163 A1 | 4/2004 | Biskeborn et al. | |
| 2004/0061967 A1 | 4/2004 | Lee et al. | |
| 2004/0141255 A1 | 7/2004 | Ogawa et al. | |
| 2004/0160693 A1 | 8/2004 | Meyer | |
| 2005/0152067 A1 * | 7/2005 | Yip et al. | 360/241.1 |
| 2005/0174688 A1 | 8/2005 | Ozue et al. | |
| 2005/0174689 A1 | 8/2005 | Ozue et al. | |
| 2005/0200887 A1 | 9/2005 | Cronch et al. | |
| 2006/0039082 A1 * | 2/2006 | Biskeborn et al. | 360/129 |
| 2007/0030594 A1 * | 2/2007 | Biskeborn et al. | 360/129 |
| 2007/0097556 A1 | 5/2007 | Biskeborn et al. | |
| 2007/0133131 A1 | 6/2007 | Biskeborn | |

FOREIGN PATENT DOCUMENTS

| | | | |
|---|---|---|---|
| JP | 01004911 A * | 1/1989 | |
| JP | 01137421 A * | 5/1989 | |
| JP | 01303617 A | 12/1989 | |
| JP | 03252911 A | 11/1991 | |
| JP | 2001052306 A | 2/2001 | |
| JP | 2003338012 A * | 11/2003 | |
| JP | 2005259198 A * | 9/2005 | |
| WO | WO 9733274 A1 * | 9/1997 | |

OTHER PUBLICATIONS

Robinson et al., "Breaking the Limits of Traditional Tape Technology Creating a New Paradigm for Tape Storage", Tandberg Data, Ittoolbox, Mar. 25, 2002, pp. 1-7, retrieved Mar. 16, 2006. http://storage.ittoolbox.com/white-papers/breaking-the-limits-of-traditional-tape-technology-creating-a-new-paradigm-for-tape-storage-1777.

* cited by examiner

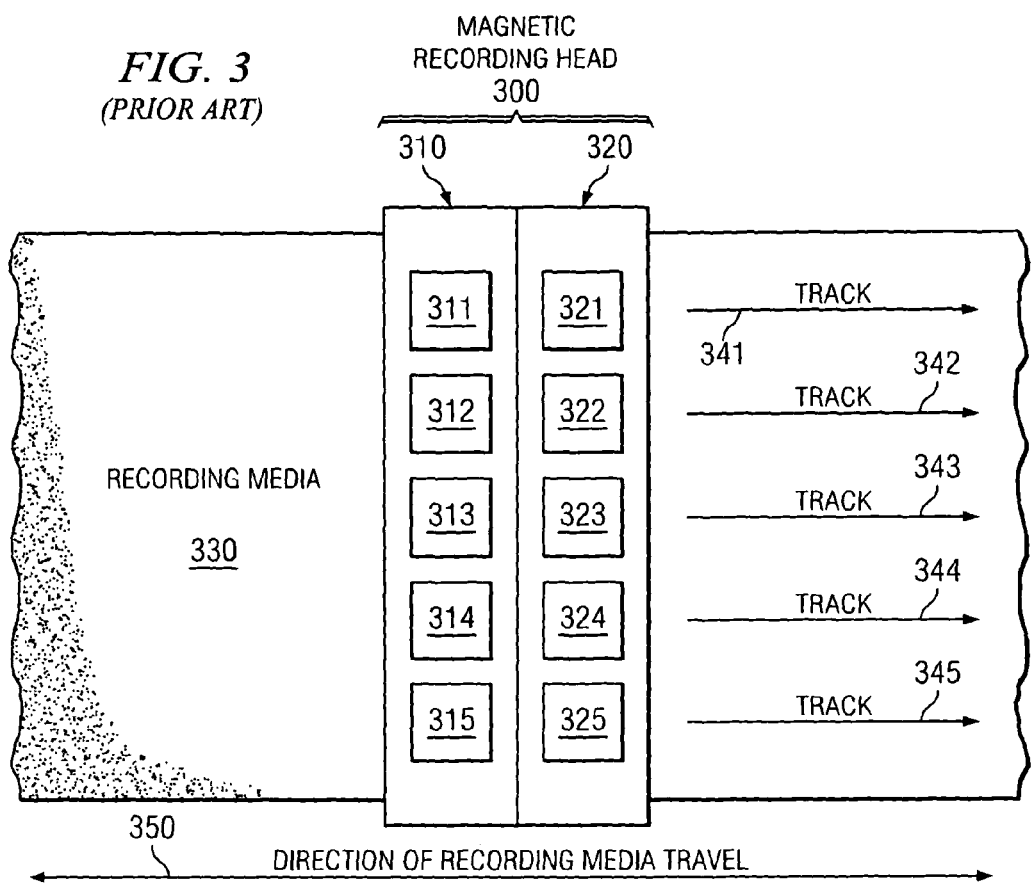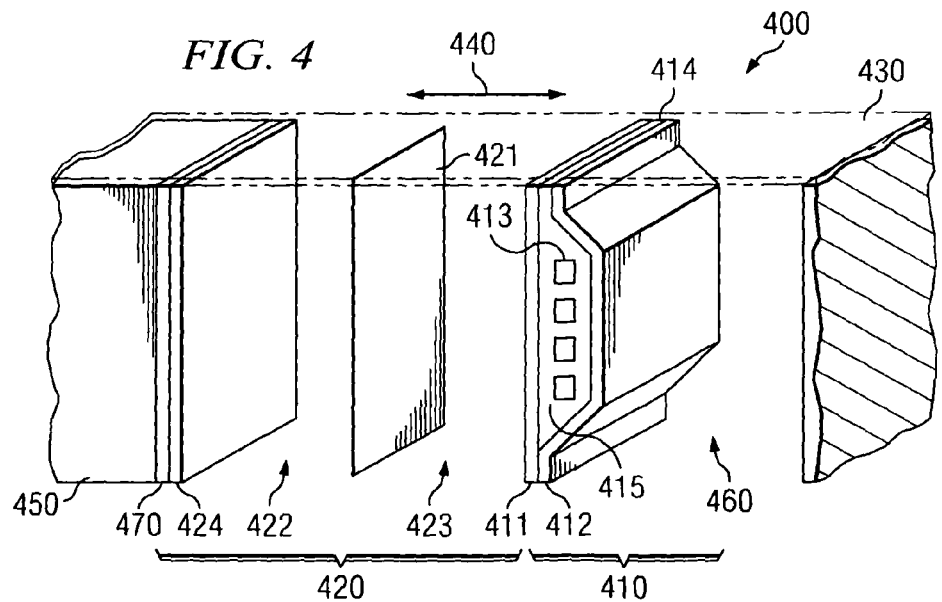

MULTI-LEVEL, MULTI-TRACK MAGNETIC RECORDING HEAD

CROSS-REFERENCE TO RELATED APPLICATIONS

The subject matter of the present invention is related to co-pending U.S. application Ser. No. 11/389,901, titled "Bi-Directional Magnetic Recording Head Built on a Common Substrate", filed on the same date herewith, assigned to the same assignee, and incorporated herein by reference.

BACKGROUND OF THE INVENTION

1. Field of the Invention

The present invention relates generally to a magnetic recording head and a method for building the magnetic recording head. Still more particularly, the present invention relates to a multi-level, multi-track magnetic recording head and a method for building the multi-level, multi-track magnetic recording head.

2. Description of the Related Art

Multi-track magnetic recording heads consist of multiple read-write devices on a single tape head. Each read-write device writes data onto a magnetically coated recording media and creates an individual track as a result of writing onto the recording media. Conventional magnetic recording heads typically have between eight and sixteen individual tracks. Periodically, the magnetic recording heads are stepped or moved into another position to write more tracks onto the tape. The movement of the magnetic recording heads allow for hundreds of tracks to be written on a single tape. Tracks written on the media run parallel to each other along the length of the recording media.

The amount of data that can be stored on a single tape depends upon the width of the written track and the precision of placing a track relative to the neighboring track. Additionally, the width of the storage space and the track placement location highly depend upon the size and placement of the read-write devices themselves. As a result, in order to increase the amount of data storage, many of the new designs for multi-track magnetic recording heads focus on the size and location of the read-write devices. However, new magnetic recording head designs are still constrained by the width of the recording media itself.

SUMMARY OF THE INVENTION

The aspects of the present invention provide a magnetic recording head, a method of manufacturing a magnetic recording head, and a magnetic recording head drive. The magnetic recording head includes a first linear level of magnetic recording devices, wherein each device in the first linear level is aligned adjacently in a row and is spaced apart from another device in the first linear level, and wherein the first linear array is perpendicular to a comparative direction of a tape travel. The magnetic recording head also includes a second linear level of magnetic recording devices connected to the first linear level of magnetic recording devices, wherein each device in the second linear level is aligned adjacently in a row and is spaced apart from another device in the second linear level, and wherein the each device in the second linear level is aligned with an insulating gap between the each device in the first linear level. The magnetic recording head includes a substrate connected to the first linear level of magnetic recording devices. The first and second linear levels of magnetic recording devices share the same substrate in the magnetic recording head.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 illustrates a tape bearing view of a conventional magnetic recording head with two arrays of read-write devices;

FIG. 4 is a sectional, exploded view of a read-write device, which may be used within an illustrative embodiment of the present invention;

DETAILED DESCRIPTION OF THE PREFERRED EMBODIMENT

Figure 1:
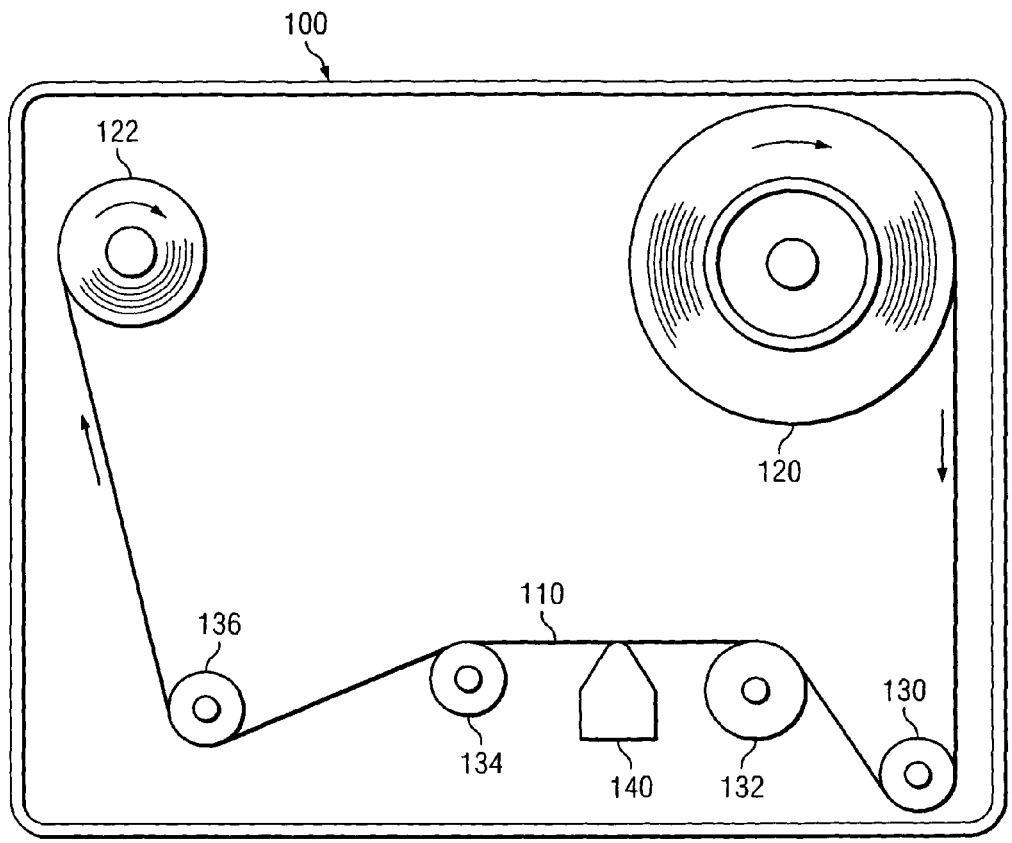
FIG. 1 is a schematic diagram of a magnetic recording head drive in which an illustrative embodiment of the present invention may be implemented.

FIG. 1 is a schematic diagram of a magnetic recording head drive in which an illustrative embodiment of the present invention may be implemented. Magnetic recording head drive 100 includes recording media 110, reels 120 and 122, guide rollers 130, 132, 134, and 136, and magnetic recording head 140. Recording media 110 is a magnetically coated plastic strip on which data is written. Recording media 110 is wound on reels 120 and 122. Reels 120 and 122 facilitate recording media 110 to move from one reel to another. In the illustrative example, recording media 110 travels in a clockwise direction around reels 120 and 122, thereby moving from reel 120 to reel 122. Guide rollers 130, 132, 134, and 136 direct the movement of recording media 110 between reels 120 and 122 and over magnetic recording head 140.

Magnetic recording head 140 typically includes several modules mechanically assembled together. Each module is composed of a single level array of read, write, read-write, or a combination of read and write devices built on a ceramic substrate. The ceramic substrate is typically made from aluminum titanium carbide (AlTiC). The inductive write devices in magnetic recording head 140 generate a magnetic flux bubble that causes a signal to be imprinted on the magnetic material on recording media 110. The imprinted signal is data written onto recording media 110. When the magnetoresistive read sensor passes over the imprinted signal, the resistance of the sensor changes. By running a small current through the read device and measuring the voltage variation, the read device is able to interpret the data recorded on recording media 110 and transmit the data in an appropriate form to a user.

The aspects of the present invention may also be implemented in a reel-to-reel magnetic recording head, a video tape, or any device utilizing a magnetic recording media. Additionally, the aspects of the present invention are not limited to the illustrative example. Many modifications and variations will be apparent to those of ordinary skill in the art.

Figure 2:
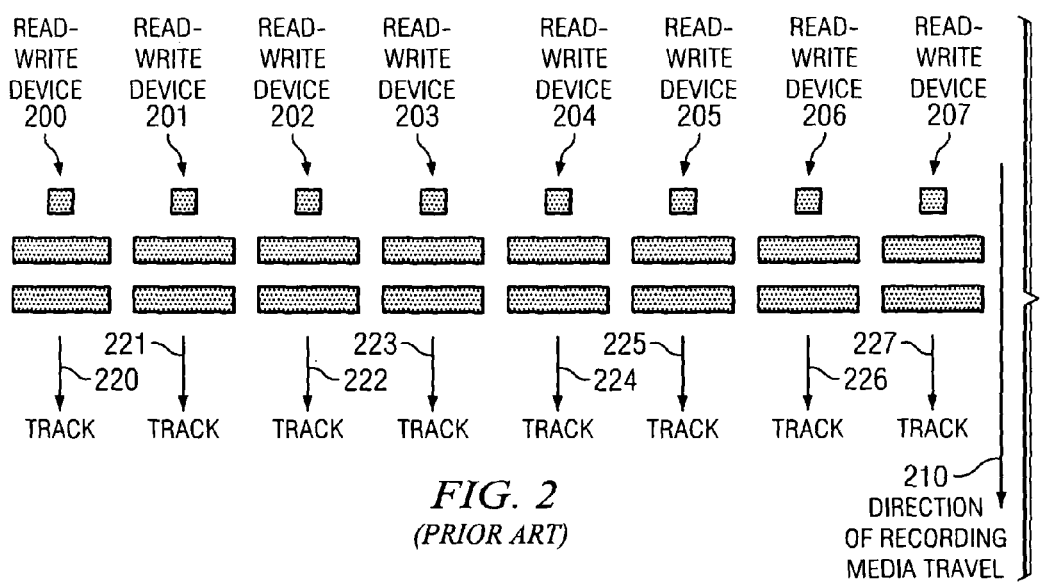
FIG. 2 is a schematic diagram of an array used in a conventional multi-track magnetic recording head.

FIG. 2 is a schematic diagram of a conventional multi-track magnetic recording head array. Read-write devices 200 through 207 are devices that may be found on magnetic recording head 140 of FIG. 1. Read-write devices 200 through 207 are the conventional schematic symbols for a read-write device. Read-write devices 200 through 207 are often referred to as merged pole devices. A device can be a read device that only reads data, a write device that only writes data, or a read-write device that both reads and writes data. In the illustrative example, devices 200 through 207 are read-write devices.

Read-write devices 200 through 207 form a single linear array or module on a magnetic recording head. Each array is built on a single substrate. The devices on the array are not limited to the illustrated example. Devices 200 through 207 may be all read, devices, all write devices, all read-write devices, or any combination thereof. In the illustrative example, devices 200 through 207 are all read-write devices.

In the perspective shown, a magnetically coated recording media (not shown) travels in direction 210. In other words, a recording media travels above read-write devices 200 through 207. The perspective shown is commonly referred to as a tape bearing surface view.

Tracks 220 through 227 are created or read by read-write devices 200 through 207 respectively. The location of tracks 220 through 227 relative to read-write devices 200 through 207 depends on the function that read-write devices 200 through 207 adopt. In the illustrative example, read-write devices 200 through 207 functions in write mode. Thus, the recording media travels across read-write devices 200 through 207 as tracks 220 through 227 are created. If, for example, read-write devices 200 through 207 are functioning in read mode, then tracks 220 through 227 on the recording media would exist prior to and after traveling across read-write devices 200 through 207.

Read-write devices 200 through 207 each create an individual corresponding track. For example, in the illustrative example, read-write device 200 writes data onto the recording media and creates track 220. Additionally, read-write device 201 writes data onto recording media 210 and creates parallel track 221. Track 221 is adjacent to track 220. The same process of writing and creating a track occurs for read-write devices 202 through 207. If, on the other hand, read-write devices 200 through 207 are functioning in read mode, then read-write devices 200 through 207 would read data on tracks 220 through 227 respectively.

Conventional recording devices, such as magnetic recording head drive 100 of FIG. 1, usually include two or more arrays of read-write devices that are mechanically glued together. Each array of devices is connected to a separate substrate. The use of two or more arrays gives magnetic recording head drive 100 the capability to read as the recording media moves either forwards, or in direction 210, or backwards, or in a direction opposite to direction 210.

FIG. 3 illustrates a tape bearing view of a conventional magnetic recording head with two arrays of read-write devices. Magnetic recording head 300 may be implemented as magnetic recording head 140 of FIG. 1.

Magnetic recording head 300 includes arrays 310 and 320. Arrays 310 and 320 are each built on a separate substrate and are mechanically glued together to form magnetic recording head 300. Each array 310 and 320 contains five read-write devices. Array 310 has read-write devices 311 through 315, and array 320 has read-write devices 321 through 325. Read-write devices 311 through 315 and 321 through 325 are similar to read-write devices 200 through 207 of FIG. 2. In other examples, devices 311 through 315 and 321 and 325 can also be read only devices, write only devices, or any combination thereof.

Recording media 330 travels across magnetic recording head 300. In the illustrative example, read-write devices 311 through 315 write data onto recording media 330 and create corresponding tracks 341 through 345 as a result of writing data onto recording media 330. Read-write devices 321 through 325 read the data created by read-write devices 311 through 315. In other words, read devices 321 through 325 read the data written onto tracks 341 through 345 by read-write devices 311 through 315. In an alternative example, read-write devices 321 through 325 can also write data onto recording media 330 and create a separate, additional track onto recording media 330.

In the illustrative example, recording media 330 can travel forwards or backwards across magnetic recording head 300, as illustrated by direction 350. Therefore, read-write devices 311 through 315 can read the same tracks, in this case tracks 341 through 345, which read-write device 311 through 315 themselves created. Read-write device 311 through 315 can also read the tracks created by read-write device 321 through 325. Likewise, read-write device 321 through 325 can read the tracks, 341 through 345, created by read-write devices 311 through 315 as well as the tracks created by themselves.

FIG. 4 is a sectional, exploded view of a read-write device, which may be used within an illustrative embodiment of the present invention. The illustrative example is modified for clarity and is not drawn to scale. Read-write device 400 can be implemented as read-write devices 200 through 207 of FIG. 2.

In the illustrative example, read-write device 400 includes write component 410 and read component 420. Write component 410 contains shared shield 411, top pole 412, conductive coil 413, gap 414, and insulation layer 415. In an alternative embodiment where read-write device 400 is only a write device, shared shield 411 is identified as a bottom pole. However, in this example, shared shield 411 is shared by both write component 410 and read component 420.

Shared shield 411, top pole 412, and conductive coil 413 form an electromagnet in write component 410. A current in coil 413 induces flux in poles 411 and 412. The flux produces a field at gap 414. As a recording media moves across recording media contact surface 430 in recording media direction 440, the field produced by the current in coil 413 produces magnetization fields on the recording media. The magnetization fields result in data being written onto the recording media.

Poles 411 and 412 are typically constructed of a magnetically permeable alloy or an amorphous mixture, which is made from at least one of the following elements: cobalt or iron. Coil 413 is a conductor that is insulated from poles 411 and 412 by insulation layer 415. Coil 413 may be made from a copper material. Insulation layer 415 is built from layers of hard baked photoresist with a layer of alumina against one of poles 411 or 412. The alumina also extends into gap 414.

In the illustrative example, read component 420 includes a magnetoresistive sensor, such as sensor 421. Sensor 421 is separated from bottom shield 424 and shared shield 411 by insulating alumina gaps 422 and 423. As a recording media travels over recording media contact surface 430 in recording media direction 440, the magnetic fields on the recording media cause magnetoresistive sensor 421 to change resistance and enable the data stored on the recording media to be read.

In the illustrative example, read-write device 400 is built upon substrate 450 and capped with insulating overcoat 460. Substrate 450 is constructed from a ceramic with good wear properties, such as aluminum titanium carbide (AlTiC), and coated with insulating alumina underlayer 470. Overcoat 460 is a thick aluminum oxide (alumina) film.

Read-write device 400 is not limited to the illustrative example. One of ordinary skill in the art will recognize a wide variety of construction for read-write device 400 that does not deviate from the spirit and scope of the aspects of the present invention. For example, various other materials, geometries, and orientations may be used for write component 410 and read component 420.

Figure 5:
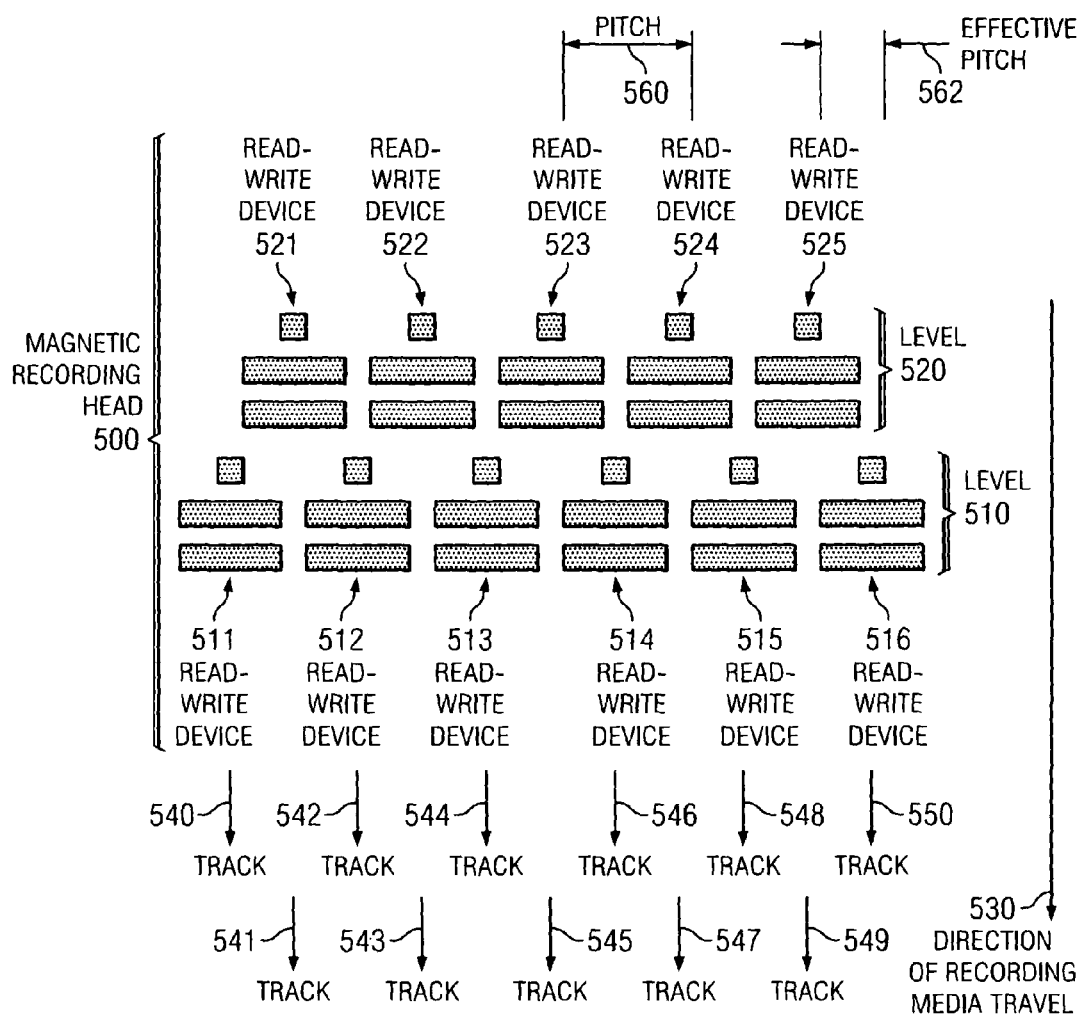
FIG. 5 is a schematic diagram of a multi-level, multi-track array used in a magnetic recording head, in accordance with an illustrative embodiment of the present invention.

FIG. 5 is a schematic diagram of a multi-level, multi-track array used in a magnetic recording head, in accordance with an illustrative embodiment of the present invention. Magnetic recording head array 500 may be substituted for magnetic recording head 140 of FIG. 1. In some embodiments, multiple magnetic recording head arrays, such as magnetic recording head array 500, may exist on a single magnetic recording head. The illustrative embodiment illustrates only a single magnetic recording head array.

Magnetic recording head array 500 is built on a single substrate. Magnetic recording head array 500 includes two levels of read-write devices: level 510 and level 520. Level 510 includes read-write devices 511 through 516. Level 520 includes read-write devices 521 through 525. In the illustrative embodiment, read-write device 511 through 516 and 521 through 525 are tape bearing surface view representations of an entire read-write device. Read-write devices 511 through 516 and 521 through 525 are similar to read-write devices 200 through 207 of FIG. 2.

Read-write devices 511 through 516 of level 510 are aligned in a linear pattern and adjacently in a row. Each read-write device 511 through 516 is spaced apart from each other. An insulating gap or a space exists between each read-write device 511 through 516 in level 510. Typically, the spacing between each read-write device 511 through 516 is small in order to maximize the number of read-write devices in a single level. The spacing between each read-write device 511 through 516 typically ranges from 50 to 500 micrometers.

A similar configuration exists for read-write devices 521 through 525 of level 520. Read-write devices 521 through 525 are aligned in a linear pattern and adjacently in a row. Each read-write device 521 through 525 is spaced apart from each other. An insulating gap or space exists between each read-write device 521 through 525.

Level 520 is manufactured upon level 510. Thus, in manufacturing, level 520 is supported upon level 510. In use, however, levels 510 and 520 are in the same plane as the tape bearing surface. Read-write devices 521 through 525 are staggered between read-write devices 511 through 516. Thus, read-write devices 521 through 525 are aligned with the insulating gap or space between read-write devices 511 through 516. For example, in the illustrative embodiment, read-write device 521 is staggered between read-write devices 511 and 512. Thus, read-write device 521 is aligned with the insulating gap or space between read-write devices 511 and 512.

The perspective shown is a tape bearing surface view. Thus, a magnetically coated recording media (not shown) travels perpendicular to magnetic recording head array 500 in comparative direction 530. Comparative direction 530 is the direction that magnetically coated recording media travels relative to the position or direction of travel of magnetic recording head array 500. The recording media travels across levels 510 and 520 of magnetic recording head array 500.

Tracks 540 through 550 are data tracks created by or read by read-write devices 511 through 516 and 521 through 525. The location of tracks 540 through 550 depends upon the function of read-write devices 511 through 516 and 521 through 525. In the illustrative embodiment, read-write devices 511 through 516 and 521 through 525 function in the write mode.

In the illustrative embodiment, read-write devices 521 through 525 in level 520 create a track in between the tracks created by read-write devices 511 through 516 in level 510. For example, in the illustrative embodiment, read-write device 521 creates track 541, where track 541 lies in between tracks 540 and 542. Read-write device 511 creates track 540, and read-write device 512 creates track 542. In conventional magnetic recording head designs, only tracks 540, 542, 544, 546, 548, and 550 are created. Such a situation is illustrated in FIGS. 2 and 3. On the other hand, the aspects of the present invention create additional tracks between the tracks in a conventional magnetic recording head. In the illustrative embodiment, tracks 541, 543, 545, 547, and 549 are created between the conventional tracks.

The aspects of the present invention also reduce the effective pitch between each read-write device in the multi-level arrangement. Pitch 560 is the distance between similar locations, such as the center or edge, of each read-write device in a single level. For example, in the illustrative embodiment, pitch 560 is the distance between the centers of read-write device 523 and read-write device 524. However, in other embodiments, pitch 560 can also be the distance between the right or left edges of read-write devices 523 and 524.

Effective pitch 562 is the distance between similar locations of a read-write device in different levels. For example, in the illustrative embodiment, the effective pitch is the distance between the center of read-write device 525 of level 520 and the center of read-write device 516 of level 510.

In accordance with the aspects of the present invention, the ratio of effective pitch 562 to pitch 560 is inversely proportional to the number of levels present on magnetic recording head array 500. For example, in the illustrative embodiment, two levels, levels 510 and 520, exist on magnetic recording head array 500. The ratio of effective pitch 562 to pitch 560 is thus 1:2. If a third level existed, then the ratio of effective pitch 562 to pitch 560 would be 1:3.

On a recording media, the ratio of effective pitch 562 to pitch 560 also translates to the number of the additional tracks created on a recording media. The number of tracks on a recording media proportionally increases as the ratio between effective pitch and pitch decreases. In other words, if the ratio of effective pitch to pitch is 1:2, the number of tracks that can be created on a recording media doubles. Likewise, if the ratio of effective pitch to pitch is 1:3, the number of tracks that can be created on a recording media triples.

Functionally, read-write devices 511 through 516 in level 510 are not limited to performing the same function as read-write devices 521 through 525 in level 520. For example, if read-write devices 511 through 516 write data onto the recording media, then read-write devices 521 through 525 can read data on the recording media. Additionally, devices 511 through 516 and 521 through 525 can be write only devices, read only devices, or a mixture of read only and write only devices. Moreover, the aspects of the present invention are not limited to the number of levels illustrated. In theory, an infinite number of levels may exist in a single magnetic head. However, customarily, the number of levels is limited to three.

Figure 6:
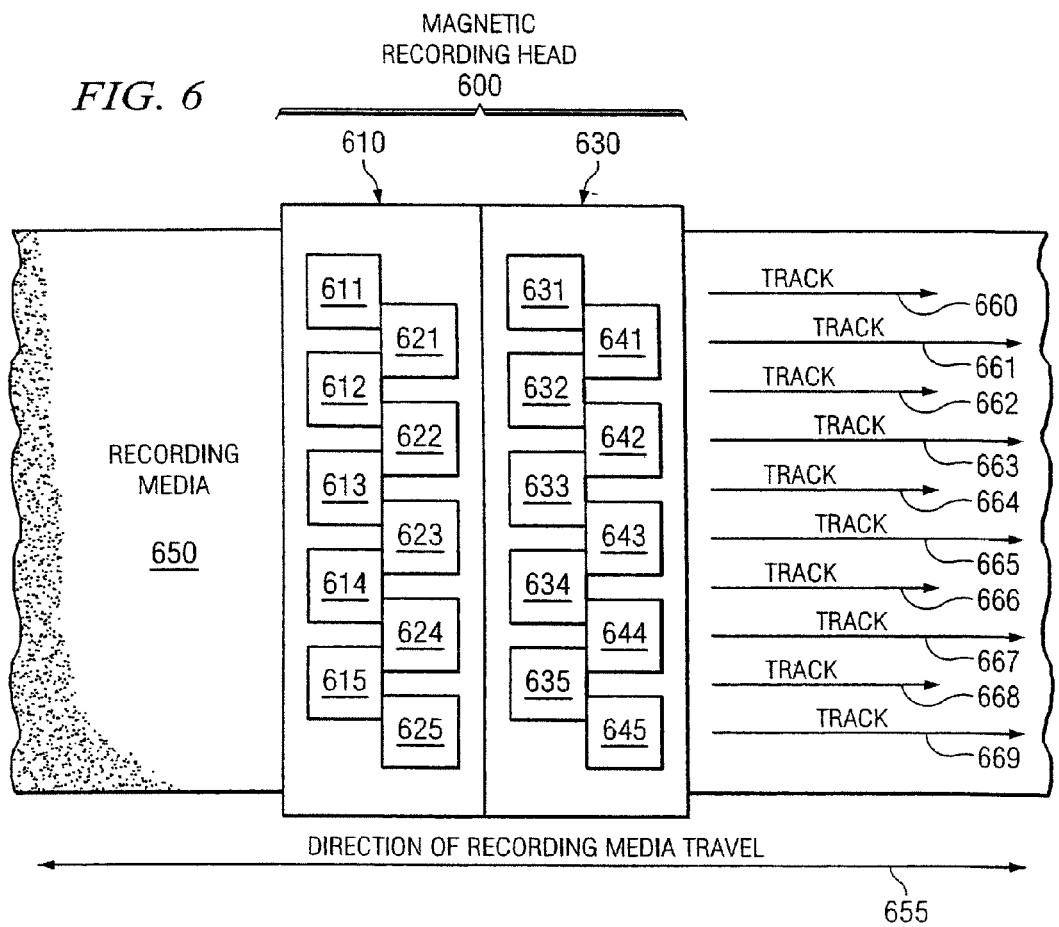
FIG. 6 illustrates a tape bearing surface arrangement of a multi-level, multi-track magnetic recording head, in accordance with an illustrative embodiment of the present invention.

FIG. 6 illustrates a tape bearing surface arrangement of a multi-level, multi-track magnetic recording head, in accordance with an illustrative embodiment of the present invention. FIG. 6 is similar to FIG. 5 but illustrates a different perspective of the aspects of the present invention.

Magnetic recording head 600 includes arrays 610 and 630. Arrays 610 and 630 are each built on a separate substrate and are mechanically glued together to form magnetic recording head 600. Arrays 610 and 630 each contain ten read-write devices arranged in accordance with the aspects of the present invention.

Array 610 includes read-write devices 611 through 615 and read-write devices 621 through 625. Read-write devices 611 through 615 are in a separate level from read-write devices 621 through 625. Each read-write device 611 through 615 is aligned linearly and adjacent to another read-write device, 611 through 615. A space or gap separates each read-write device 611 through 615. Each read-write device 621 through 625 is aligned linearly and adjacent to another read-write device, 621 through 625. A space or gap separates each read-write device 621 through 625. Read-write devices 621 through 625 are staggered between read-write devices 611 through 615. Thus, read-write devices 621 through 625 align with the gaps between read-write devices 611 through 615.

Array 630 is arranged in a similar manner as array 610. Array 630 includes read-write devices 631 through 635 and read-write devices 641 through 645. Each read-write device 631 through 635 is aligned linearly and adjacent to another read-write device, 631 through 635. A space or gap separates each read-write device 631 through 635. Each read-write device 641 through 645 is aligned linearly and adjacent to another read-write device, 641 through 645. A space or gap separates each read-write device 641 through 645. Read-write devices 641 through 645 are staggered between read-write devices 631 through 635. Thus, read-write devices 641 through 645 align with the gaps between read-write devices 631 through 635.

Recording media 650 travels in comparative direction 655 and across magnetic recording head 600. Recording media 650 can travel forwards or backwards, as shown by comparative direction 655. In the illustrative embodiment, tracks 660 through 669 are data tracks created by array 610. Read-write devices 621 through 625 create data tracks in between the tracks created by read-write devices 611 through 615. For example, in the illustrative embodiment, read-write device 621 creates track 661, which resides in between tracks 660 and 662. Read-write device 611 creates track 660, and read-write device 612 creates track 662.

In an alternative embodiment, additional tracks may be created by array 630. An additional track may be created by each read-write device 631 through 635 and 641 through 645. The track pattern created by array 630 will be similar to that created by array 610. In essence, the aspects of the present invention allow for double the number of tracks to be created compared to a conventional magnetic recording head, as illustrated in FIG. 3.

In use, read-write devices 611 through 615 and 621 through 625 reside in the same plane as the tape bearing surface. Thus, from the media's perspective, read-write devices 611 through 615 do not sit at a level lower than read-write devices 621 through 625. In manufacturing, however, read-write devices 621 through 625 are built on read-write devices 611 through 615. In the perspective shown, read-write devices 621 through 625 are in a row immediately following and staggered between read-write devices 611 through 615.

Figure 7:
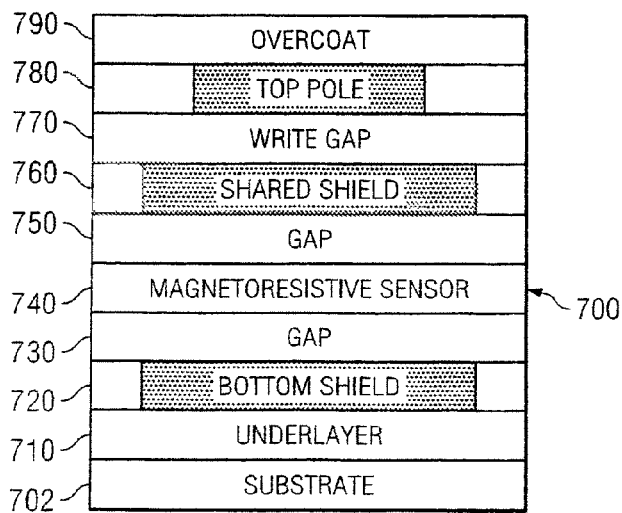
FIG. 7 is a schematic diagram illustrating the components of a conventional read-write device as seen from the tape bearing surface, which may be used within an illustrative embodiment of the present invention.

FIG. 7 is a schematic diagram illustrating the components of a conventional read-write device as seen from the tape bearing surface, which may be used within an illustrative embodiment of the present invention. The components of read-write device 700 are similar to the components of read-write device 400 described in FIG. 4.

Read-write device 700 includes substrate 702, underlayer 710, bottom shield 720, gap 730, magnetoresistive sensor 740, gap 750, shared shield 760, write gap 770, top pole 780, and overcoat 790. Substrate 702 is a thin ceramic wafer, usually made from aluminum titanium carbide (AlTiC), that forms the base of read-write device 700. Insulating underlayer 710 is an aluminum oxide (alumina) base layer that read-write device 700 is built upon. Bottom shield 720 limits the amount of recording media that magnetoresistive sensor 740 reads. Bottom shield 720 is made from a magnetic material, such as cobalt zirconium tantalum (CZT), nickel iron (NiFe), or iron nitride (FeN). Insulating gap 730 separates bottom shield 720 from magnetoresistive sensor 740. Insulating gap 730 is similar to insulating gaps 422 and 423 of FIG. 4 and is made of a thin alumina film. Magnetoresistive sensor 740, similar to sensor 421 of FIG. 4, is a magnetic read sensor used to read data for a particular track on the recording media. Insulating gap 750 separates magnetoresistive sensor 740 from shared shield 760 and is made from a thin alumina film.

Shared shield 760, like bottom shield 720, limits the amount of recording media that magnetoresistive sensor 740 reads. Shared shield 760 serves as a component for both the write and read elements of read-write device 700. Shared shield 760 combines the bottom pole of a write element and the top shield of the read element. Write gap 770 defines the space between the bottom pole and top pole of a write element. In the illustrative example, write gap 770 defines the space between shared shield 760 and top pole 780. Write gap 770 is a non-magnetic spacer. In these examples, write gap 770 is made from layers of alumina and titanium. Top pole 780 is one pole of the magnetic field created by a write element. Overcoat 790 caps read-write device 700 and is similar to overcoat 460 of FIG. 4.

Figure 8:
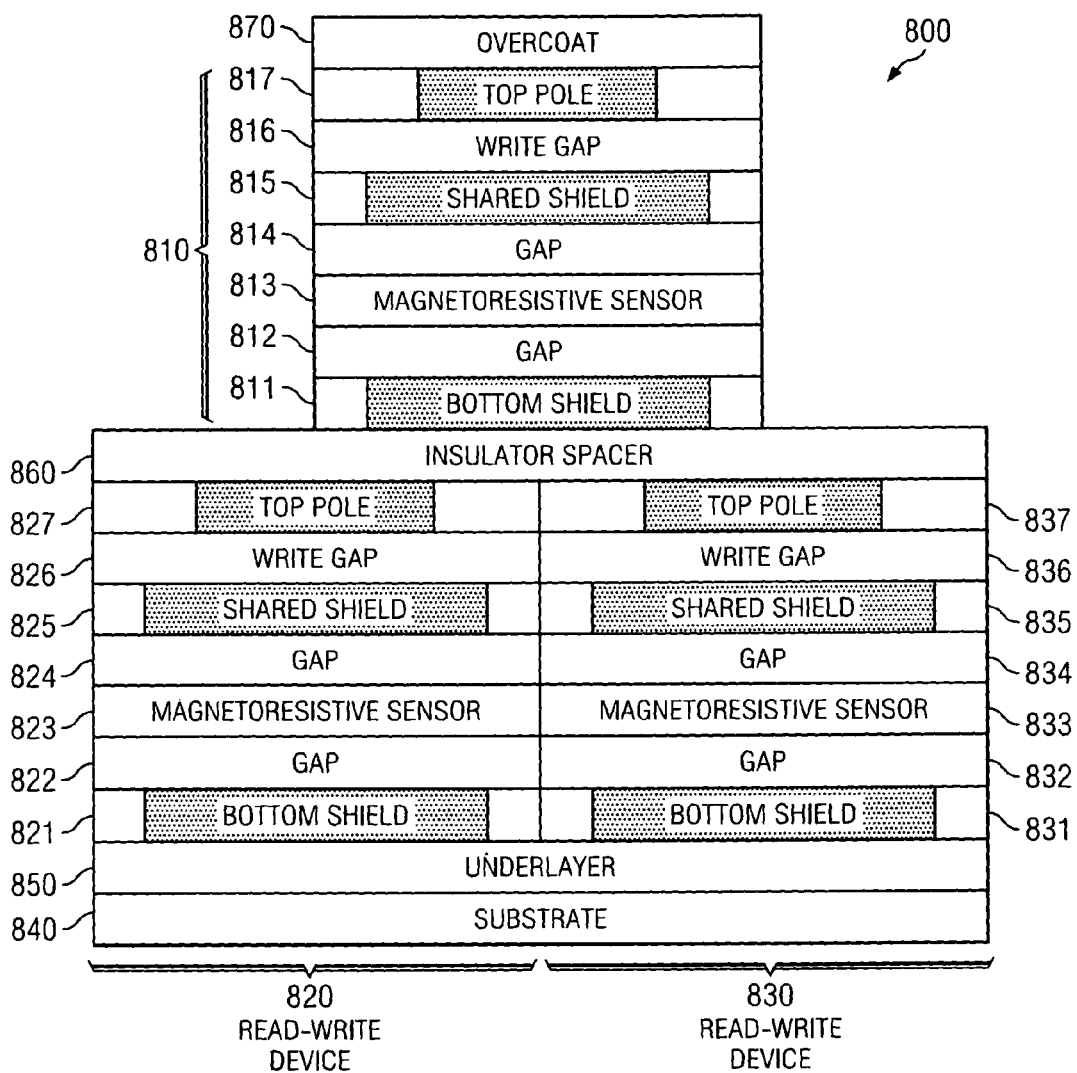
FIG. 8 is a schematic illustrating the architecture of a multi-level, multi-track array used in a magnetic recording head, in accordance with an illustrative embodiment of the present invention.

FIG. 8 is a schematic illustrating the architecture of a multi-level, multi-track array used in a magnetic recording head, in accordance with an illustrative embodiment of the present invention. FIG. 8 is similar to the read-write device arrangements depicted in FIGS. 5 and 6, but FIG. 8 shows a detailed construction of the read-write device levels.

In the illustrative embodiment, magnetic recording head array 800 includes read-write devices 810, 820, and 830. Magnetic recording head array 800 is similar to magnetic recording head array 500 of FIG. 5. Read-write devices 810, 820, and 830 are similar to read-write devices 700 of FIG. 7.

In the illustrative embodiment, read-write devices 820 and 830 are on a single level and aligned adjacently to each other. Read write device 810 is on another level separate from read-write devices 820 and 830. Read-write device 810 is staggered between read-write devices 820 and 830. Read-write device 810 is supported upon read-write devices 820 and 830.

Read-write device 810 includes bottom shield 811, gap 812, magnetoresistive sensor 813, gap 814, shared shield 815, write gap 816, and top pole 817. Read-write devices 820 and 830 have similar components as read-write device 810. Read-write device 820 includes bottom shield 821, gap 822, magnetoresistive sensor 823, gap 824, shared shield 825, write gap 826, and top pole 827. Read-write device 830 includes bottom shield 831, gap 832, magnetoresistive sensor 833, gap 834, shared shield 835, write gap 836, and top pole 837.

Read-write devices 820 and 830 connect to substrate 840 through underlayer 850. Read-write device 810 does not have a separate substrate and is built directly on read-write device 820 and 830. Thus, bottom shield 811 of read-write device 810 connects directly to insulator spacer 860. Overcoat 870 is the top layer of magnetic head array 800.

Figure 9:
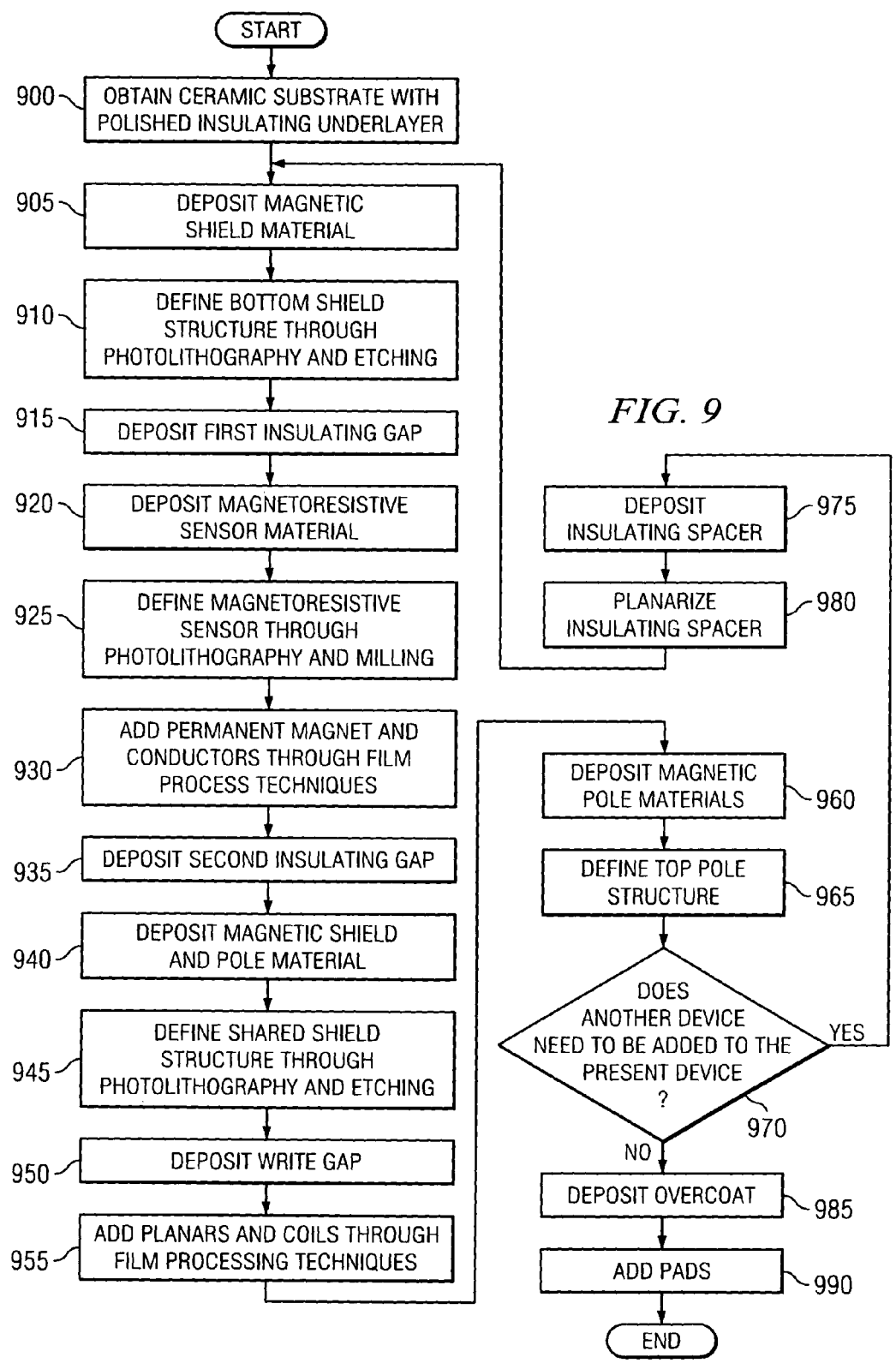
FIG. 9 is a flowchart for the process of manufacturing a multi-level, multi-track array used in a magnetic recording head, in accordance with an illustrative embodiment of the present invention.

FIG. 9 is a flowchart for the process of manufacturing a multi-level, multi-track array used in a magnetic recording head, in accordance with an illustrative embodiment of the present invention. The magnetic recording head array is similar to magnetic recording head array 800 of FIG. 8.

The manufacturing process begins with obtaining a ceramic substrate with a polished insulating underlayer (step 900). The process then deposits the material for the magnetic shield onto the ceramic substrate (step 905). The process then defines the bottom shield structure through the processes of photolithography and etching (step 910). The process then deposits the first insulating gap onto the bottom shield (step 915) and deposits the material for the magnetoresistive sensor onto the first insulating gap (step 920). The process then defines the magnetoresistive sensor through the processes of photolithography and milling (step 925). Film processing techniques then add permanent magnets and conductors onto magnetoresistive sensor (step 930). The process then deposits the second insulating gap (step 935). The process then deposits the materials for the magnetic shield and pole onto the second insulating gap to form the shared shield (step 940). The process then defines the shared shield structure through the processes of photolithography and etching (step 945). The process then deposits the write gap (step 950) and adds planars and coils through film processing techniques (step 955). The process then deposits magnetic pole materials to form the top pole (step 960). The process then defines the top pole structure (step 965).

A determination is then made as to whether another device is to be added to the present device (step 970). If another device is to be added ("yes" output to step 970), then the process deposits an insulating spacer (step 975). The process then planarizes or polishes smooth the insulating spacer to remove any lumps existing in the insulating spacer (step 980). The process then returns to step 905 and repeats the process (step 905 through 965). If another device is not to be added ("no" output to step 970), then the insulating overcoat is deposited (step 985) and pads are added to the magnetic recording head array (step 990). The process terminates thereafter.

What is claimed is:

1. A magnetic recording head comprising:
    a first linear level of magnetic recording devices, wherein each device in the first linear level is aligned adjacently in a row and is spaced apart from another device in the first linear level, and wherein the first linear level is perpendicular to a comparative direction of a recording media travel;
    a second linear level of magnetic recording devices connected to the first linear level of magnetic recording devices, wherein each device in the second linear level is aligned adjacently in a row and is spaced apart from another device in the second linear level, and wherein the each device in the second linear level is aligned with an insulating gap between the each device in the first linear level;
    a third linear level of magnetic recording devices, wherein each device in the third linear level is aligned adjacently in a row and is spaced apart from another device in the third linear level;
    a fourth linear level of magnetic recording devices connected to the third linear level of magnetic recording devices, wherein each device in the fourth linear level is aligned adjacently in a row and is spaced apart from another device in the fourth linear level, and wherein the each device in the fourth linear level is aligned with an insulating gap between the each device in the third linear level; and
    a first substrate connected to the first linear level of magnetic recording devices; and
    a second substrate connected to the third linear level of magnetic recording devices;
    wherein the second substrate is coupled to the first substrate such that the each device in the fourth linear level is aligned with the insulating gap between the each device in the first linear level; wherein at least one magnetic recording device in the second linear level overlaps at least a portion of a pair of the magnetic recording devices in the first linear level; and wherein at least one magnetic recording device in the fourth linear level overlaps at least a portion of a pair of the magnetic recording devices in the third linear level.

2. The magnetic recording head of claim 1 wherein the first substrate is fixed to the second substrate via adhesive.

3. The magnetic recording head of claim 1 wherein the each device in the first linear level and in the second linear level forms a first written track of data, and wherein each first written track formed by the each device in the second linear level is between a track formed by the each device in the first linear level, and wherein each written track formed by the each device in the second linear level corresponds to the insulating gap between the each device in the first linear level.

4. The magnetic recording head of claim 3 wherein the each device in the third linear level and in the fourth linear level forms a second written track of data, and wherein each second written track formed by the each device in the fourth linear level is between a track formed by the each device in the third linear level, and wherein each written track formed by the each device in the fourth linear level corresponds to the insulating gap between the each device in the third linear level.

5. The magnetic recording head of claim 1, further comprising a first insulating insulator connecting the first linear level to the second linear level.

6. The magnetic recording head of claim 5 further comprising a second insulating insulator connecting the third linear level to the fourth linear level.

7. The magnetic recording head of claim 1 wherein the each device in the first linear level and the second linear level are a combination of read devices and write devices.

8. The magnetic recording head of claim 7 wherein the each device in the third linear level and the fourth linear level are a combination of read devices and write devices.

9. A method for manufacturing a magnetic recording head, the method comprising:
    forming a first linear level of magnetic recording devices, wherein each device in the first linear level is aligned adjacently in a row and is spaced apart from another device in the first linear level, and wherein the first linear level is perpendicular to a comparative direction of a recording media travel;

forming a second linear level of magnetic recording devices connected to the first linear level of magnetic recording devices, wherein each device in the second linear level is aligned adjacently in a row and is spaced apart from another device in the second linear level, and wherein the each device in the second linear level is aligned with an insulating gap between the each device in the first linear level;

forming a third linear level of magnetic recording devices, wherein each device in the third linear level is aligned adjacently in a row and is spaced apart from another device in the third linear level;

forming a fourth linear level of magnetic recording devices connected to the third linear level of magnetic recording devices, wherein each device in the fourth linear level is aligned adjacently in a row and is spaced apart from another device in the fourth linear level, and wherein the each device in the fourth linear level is aligned with an insulating gap between the each device in the third linear level;

connecting a first substrate to the first linear level of magnetic recording devices;

connecting a second substrate to the third linear level of magnetic recording devices; and connecting the second substrate to the first substrate such that the each device in the fourth linear level is aligned with the insulating gap between the each device in the first linear level; wherein at least one magnetic recording device in the second linear level overlaps at least a portion of a pair of the magnetic recording devices in the first linear level; and wherein at least one magnetic recording device in the fourth linear level overlaps at least a portion of a pair of the magnetic recording devices in the third linear level.

10. The method of claim 9 wherein connecting the second substrate to the first substrate further comprises applying an adhesive such that the first substrate and the second substrate are fixed together.

11. The method of claim 9 further comprising connecting the first linear level to the second linear level with a first insulating insulator.

12. The method of claim 11 further comprising connecting the third linear level to the fourth linear level with a second insulating insulator.

13. The method of claim 9 wherein the each device in the first linear level and the second linear level are a combination of read devices and write devices.

14. The method of claim 13 wherein the each device in the third linear level and the fourth linear level are a combination of read devices and write devices.

15. A magnetic recording head comprising:
a first linear level of magnetic recording devices, wherein each device in the first linear level is aligned adjacently in a row and is spaced apart from another device in the first linear level, and wherein the first linear level is perpendicular to a comparative direction of a recording media travel;

a second linear level of magnetic recording devices connected to the first linear level of magnetic recording devices, wherein each device in the second linear level is aligned adjacently in a row and is spaced apart from another device in the second linear level, and wherein the each device in the second linear level is aligned with an insulating gap between the each device in the first linear level;

a third linear level of magnetic recording devices, wherein each device in the third linear level is aligned adjacently in a row and is spaced apart from another device in the third linear level;

a fourth linear level of magnetic recording devices connected to the third linear level of magnetic recording devices, wherein each device in the fourth linear level is aligned adjacently in a row and is spaced apart from another device in the fourth linear level, and wherein the each device in the fourth linear level is aligned with an insulating gap between the each device in the third linear level; and a first substrate connected to the first linear level of magnetic recording devices; and a second substrate connected to the third linear level of magnetic recording devices;

wherein the second substrate is coupled to first substrate via an adhesive; wherein at least one magnetic recording device in the second linear level overlaps at least a portion of a pair of the magnetic recording devices in the first linear level; and wherein at least one magnetic recording device in the fourth linear level overlaps at least a portion of a pair of the magnetic recording devices in the third linear level.

16. The magnetic recording head of claim 15 wherein the second substrate is coupled to the first substrate via an adhesive such that the each device in the fourth linear level is aligned with the insulating gap between the each device in the first linear level.

17. The magnetic recording head of claim 15 wherein the each device in the first linear level and in the second linear level forms a first written track of data, and wherein each first written track formed by the each device in the second linear level is between a track formed by the each device in the first linear level, and wherein each written track formed by the each device in the second linear level corresponds to the insulating gap between the each device in the first linear level.

18. The magnetic recording head of claim 17 wherein the each device in the third linear level and in the fourth linear level forms a second written track of data, and wherein each second written track formed by the each device in the fourth linear level is between a track formed by the each device in the third linear level, and wherein each written track formed by the each device in the fourth linear level corresponds to the insulating gap between the each device in the third linear level.

19. The magnetic recording head of claim 16, further comprising a first insulating insulator connecting the first linear level to the second linear level.

20. The magnetic recording head of claim 17 further comprising a second insulating insulator connecting the third linear level to the fourth linear level.

* * * * *

UNITED STATES PATENT AND TRADEMARK OFFICE
CERTIFICATE OF CORRECTION

| | | |
|---|---|---|
| PATENT NO. | : 7,751,148 B1 | |
| APPLICATION NO. | : 11/389842 | |
| DATED | : July 6, 2010 | |
| INVENTOR(S) | : April L. Alstrin et al. | |

It is certified that error appears in the above-identified patent and that said Letters Patent is hereby corrected as shown below:

In column 12, line 56, in claim 20, delete "claim 17" and insert -- claim 19 --, therefor.

Signed and Sealed this
Nineteenth Day of April, 2011

David J. Kappos
*Director of the United States Patent and Trademark Office*